Sept. 25, 1951  H. J. FEY  2,568,725
RECEPTACLE
Filed Jan. 24, 1949

INVENTOR
HARRY J. FEY
BY *Ern Harrington*
ATTORNEY

Patented Sept. 25, 1951

2,568,725

UNITED STATES PATENT OFFICE 2,568,725

RECEPTACLE

Harry J. Fey, St. Louis, Mo., assignor to James R. Kearney Corporation, St. Louis, Mo., a corporation of Missouri Application January 24, 1949, Serial No. 72,415

4 Claims. (Cl. 229—17)

This invention relates generally to receptacles, and more specifically to small receptacles formed of cardboard, or other suitable material, in which various small articles may be marketed, the predominant object of the invention being to provide a receptacle of this type which is of such unique and improved construction and arrangement that the removal of the articles contained within the receptacle is simplified and facilitated.

Figure 2:
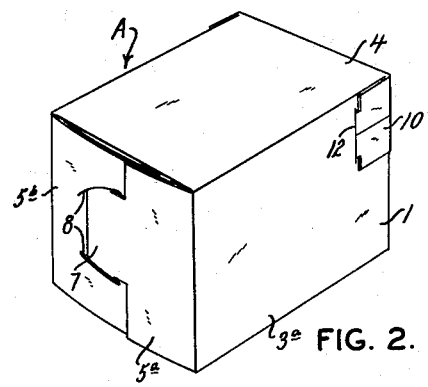
Fig. 2 is a perspective view of the exterior of the receptacle similar to Fig. 1 but looking toward the rear of the receptacle.
Figure 6:
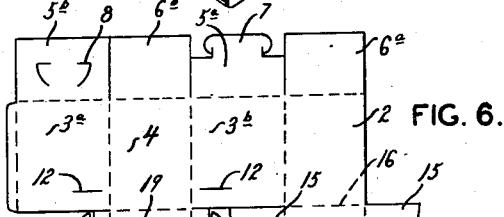
Fig. 6 is a view illustrating the blank from which the outer housing of the receptacle of this invention is formed.

In the drawing, wherein is shown for purposes of illustration, merely, one embodiment of the invention, A designates the improved receptacle generally. The receptacle A comprises an outer housing 1 which is formed from the blank shown in Fig. 6, said outer housing being provided with a bottom wall 2, side walls 3a and 3b, and a top wall 4. The rear wall of the receptacle A comprises a pair of wall portions 5a and 5b which are extended from the side walls 3a and 3b, and are brought into overlapping relation, as is shown to good advantage in Fig. 2, and folded upwardly and downwardly inwardly of the rear wall portions 5a and 5b are flaps 6a and 6b which are formed, respectively, on the bottom and top walls 2 and 4 of the receptacle A. The rear wall portion 5a is provided with a tongue 7 (Fig. 2) which is inserted in a slit 8 formed in the rear wall portion 5b whereby said rear wall portions 5a and 5b are held in engaged relation.

Figure 1:
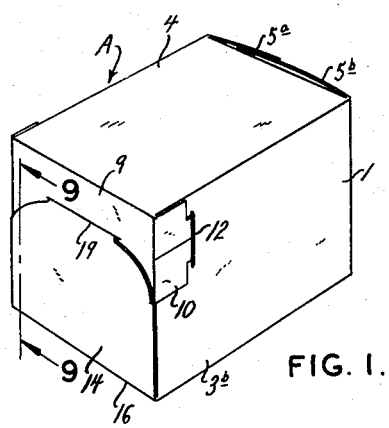
Fig. 1 is a perspective view showing the exterior of the receptacle of this invention and looking toward the front thereof.
Figure 3:
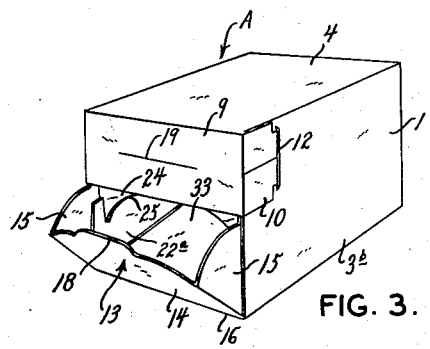
Fig. 3 is a perspective view of the receptacle similar to Fig. 1 but showing the receptacle in an open condition.

The outer housing 1 of the receptacle A is provided with an upper front wall portion 9 which comprises an extension of the top wall 4, said upper front wall portion including rearwardly projected extensions 10 on which are formed tongues 11 and these tongues are extended through slits 12 formed in the opposed side walls of the outer housing 1. The lower portion of the front wall of the outer housing is in the form of a closure 13 which is an integral extension of the bottom wall 2 of said outer housing, as is shown to good advantage in Fig. 6. The closure 13 comprises a main portion 14 from which opposed wing portions 15 are extended rearwardly, these wing portions being disposed inwardly of the opposed side walls of the outer housing of the receptacle in sliding contact with the inner faces of said opposed side walls. The line of junction 16 between the bottom wall 2 of the outer housing 1 and the main portion 14 of the closure 13 serves as a hinge which permits said closure to be moved from the closed position in which it is shown in Fig. 1 to its open position as shown in Fig. 3, the opposed wing portions 15 of said closure being provided with abutments 17 which are adapted to contact with inner face portions of the upper front wall portion 9 so as to limit outward movement of the closure. Also, the main portion 14 of the closure 13 is provided at its upper edge with a tongue 18 which is insertable into a slit 19 formed in the upper front wall portion 9 so as to lock the closure in its closed position.

Figure 4:
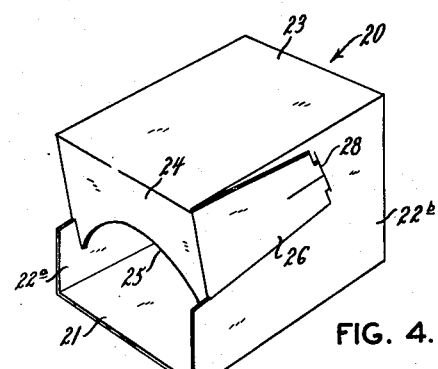
Fig. 4 is a perspective view of a liner which forms a part of the receptacle of this invention.
Figures 7, 9:
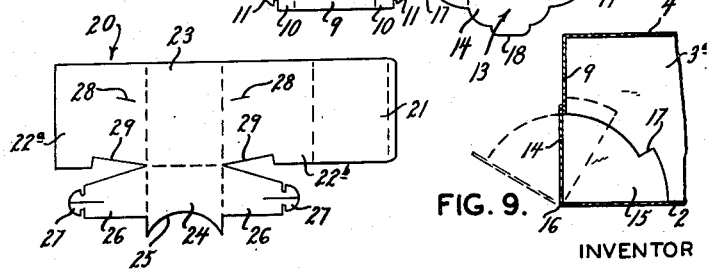
Fig. 7 is a view illustrating the blank from which the liner of the receptacle of this invention is formed.
Fig. 9 is a fragmentary, vertical section taken on line 9—9 of Fig. 1.

Disposed within the outer housing 1 of the receptacle A is a liner 20, which is shown to good advantage in Fig. 4 and whose blank is shown in Fig. 7. The liner 20 is provided with a bottom wall 21, opposed side walls 22a and 22b, a top wall 23, and an upper front wall portion 24. The upper front wall portion is provided with a curved lower edge 25, and said upper front wall portion includes opposed, side wings 26 which extend rearwardly of the liner 20, said opposed, side wings being provided with tongues 27 which are extended into slits 28 formed in the side walls of the liner so as to lock the upper front wall portion in its proper position where opposed side portions of said upper front wall portion abut against inclined front edge portions 29 of the opposed, side walls 22a and 22b of the liner 20. The liner 20, as has been previously stated herein, is disposed within the outer housing 1 of the receptacle A, said liner being of just sufficiently less dimensions relative to the outer housing as to permit of the insertion of the liner into the outer housing from the rear thereof. It is to be noted that the rear portion of the liner is open, and that the opposed wings 15 of the closure 13 of the outer housing 1 are disposed for movement between the opposed side walls of the outer housing and the opposed side walls of the liner (Fig. 1).

Figure 5:
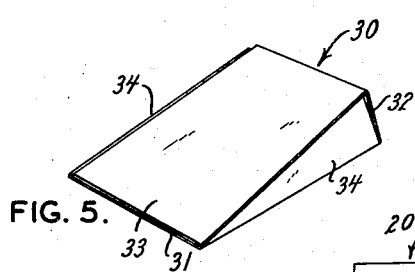
Fig. 5 is a perspective view of a false bottom which forms a part of the receptacle of this invention.
Figure 8:
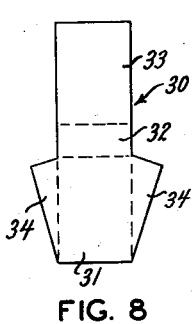
Fig. 8 is a view illustrating the blank from which the false bottom of the receptacle of this invention is formed.

The receptacle A is provided with an inclined false bottom 30 which is illustrated in perspective in Fig. 5 and whose blank is illustrated in Fig. 8. The false bottom 30 comprises a lower portion 31 from the rear end of which a short, vertical wall 32 is extended, there being an upper downwardly and forwardly inclined wall 33 which is projected from the top of said short, vertical wall 32. Also, the lower portion 31 of the false bottom 30 is provided with tapered wing portions 34 which are folded upwardly so that the inclined, top edges of said wing portions contact with under face portions of the upper inclined wall 33 of said false bottom 30 so as to provide support for said upper, inclined wall 33. The false bottom is disposed within the receptacle A with its lower portion 31 resting upon the bottom wall 21 of the liner 20, the false bottom being so dimensioned that it fits closely within the receptacle. The purpose of the false bottom 30 is to cause articles packaged within the receptacle A to be urged forwardly of the receptacle toward the discharge opening of the receptacle at the lower portion of the front thereof.

The improved receptacle A is shipped or transported in the condition in which it is shown in Fig. 1; that is to say with the closure 13 closed and locked against accidental opening by the tongue 18 thereof being inserted into the slit 19 formed in the upper, front wall portion 9. When it is desired to open the receptacle in order to extract packaged articles therefrom, the tongue 18 of the closure 13 is withdrawn from the slit 19 and said closure is moved to its open position, as shown in Fig. 3, the inclined false bottom 30 causing the packaged articles to be fed toward the discharge opening of the receptacle.

I claim:

1. A receptacle comprising an outer housing formed of folded material, said housing being provided with a bottom wall and an upper front wall portion beneath which a discharge opening is formed for articles contained within the receptacle, a movable closure for closing said discharge opening, said closure comprising a movable extension of said bottom wall and having opposed wing portions which are folded portions of said closure and which in the closed position of the closure are disposed within said housing, abutments formed on said opposed wing portions of said closure which are adapted to engage said upper front wall portion so as to limit outward movement of said closure to its open position, and a liner located within said outer housing which is formed of folded material, and is provided with an upper front wall portion which is inclined downwardly and rearwardly and which is provided with a discharge opening beneath said upper front wall portion.

2. A receptacle comprising an outer housing formed of folded material, said housing being provided with a bottom wall and an upper front wall portion beneath which a discharge opening is formed for articles contained within the receptacle, a movable closure for closing said discharge opening, said closure comprising a movable extension of said bottom wall and having opposed wing portions which are folded portions of said closure and which in the closed position of the closure are disposed within said housing, abutments formed on said opposed wing portions of said closure which are adapted to engage said upper front wall portion so as to limit outward movement of said closure to its open position, and a liner located within said outer housing which is formed of folded material and is provided with an upper front wall portion which is inclined downwardly and rearwardly and which is provided with a discharge opening beneath said upper front wall portion, said liner being provided with a bottom wall, a top wall, and opposed side walls, and said opposed wing portions of said closure being interposed between the side walls of said outer housing and the side walls of said liner.

3. A receptacle comprising an outer housing formed of folded material, said housing being provided with a bottom wall and an upper front wall portion beneath which a discharge opening is formed for articles contained within the receptacle, a movable closure for closing said discharge opening, said closure comprising a movable extension of said bottom wall and having opposed wing portions which are folded portions of said closure and which in the closed position of the closure are disposed within said housing, abutments formed on said opposed wing portions of said closure which are adapted to engage said upper front wall portion so as to limit outward movement of said closure to its open position, a liner located within said outer housing which is formed of folded material and is provided with an upper front wall portion which is inclined downwardly and rearwardly and which is provided with a discharge opening beneath said upper front wall portion, said liner being provided with a bottom wall, a top wall, and opposed side walls, and said opposed wing portions of said closure being interposed between the side walls of said outer housing and the side walls of said liner, and a false bottom located within the lower portion of said liner, said false bottom having an upper surface which is inclined forwardly and downwardly toward the discharge openings of said liner and said outer housing.

4. A receptacle comprising an outer housing formed of folded material, said housing being provided with a bottom wall and an upper front wall portion beneath which a discharge opening is formed for articles contained within the receptacle, a movable closure for closing said discharge opening, said closure comprising a movable extension of said bottom wall and having opposed wing portions which are folded portions of said closure and which in the closed position of the closure are disposed within said housing, abutments formed on said opposed wing portions of said closure which are adapted to engage said upper front wall portion so as to limit outward movement of said closure to its open position, a liner located within said outer housing which is formed of folded material and is provided with an upper front wall portion which is inclined downwardly and rearwardly and which is provided with a discharge opening beneath said upper front wall portion, said liner being provided with a bottom wall, a top wall, and opposed side walls, and said opposed wing portions of said closure being interposed between the side walls of said outer housing and the side walls of said liner, and a wedge-shaped false bottom located within the lower portion of said liner, said false bottom having an upper surface which is inclined forwardly and downwardly toward the discharge openings of said liner and said outer housing.

HARRY J. FEY.

REFERENCES CITED

The following references are of record in the file of this patent:

UNITED STATES PATENTS

| Number | Name | Date |
|---|---|---|
| 1,000,624 | Pexton | Aug. 15, 1911 |
| 1,020,536 | Byrne | Mar. 19, 1912 |
| 1,272,411 | FitzGerald | July 16, 1918 |
| 1,707,853 | Haberman | Apr. 2, 1929 |
| 1,847,028 | Townsend | Feb. 23, 1932 |
| 2,233,488 | Powell | Mar. 4, 1941 |
| 2,330,294 | Leavitt et al. | Sept. 28, 1943 |